Oct. 27, 1964     J. H. ZEDER, JR     3,154,664
BLANKING DIES AND METHOD OF MAKING SAME
Filed Dec. 7, 1962
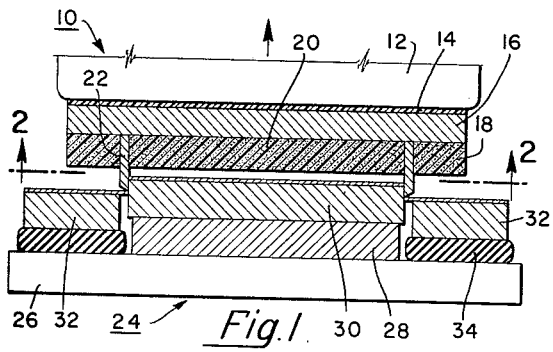
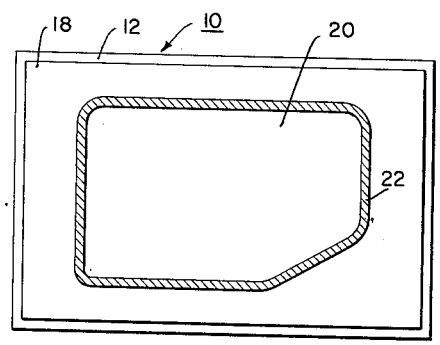
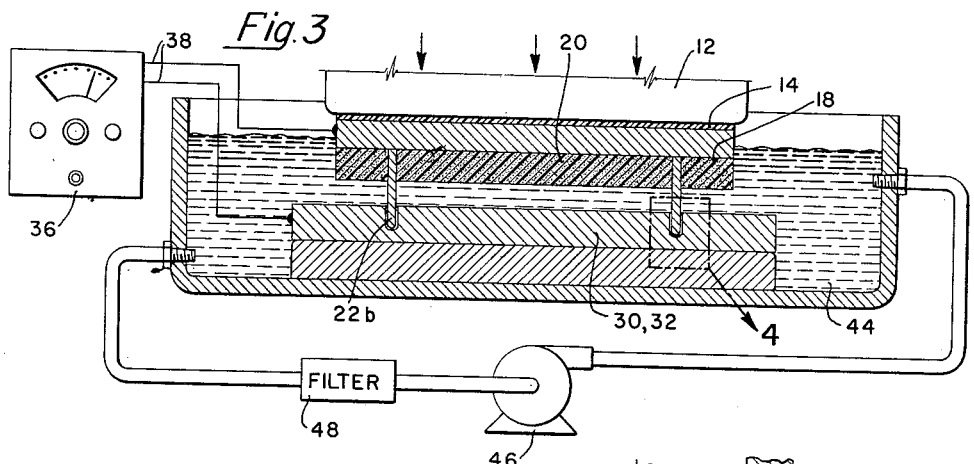
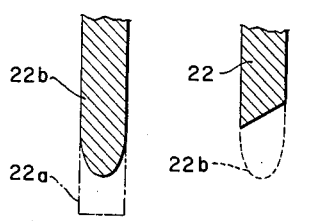
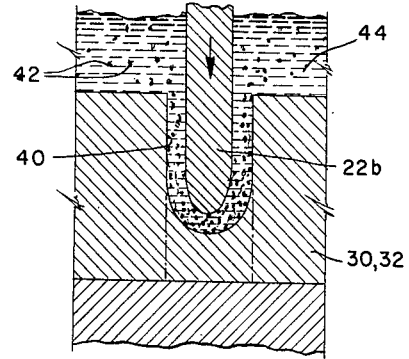
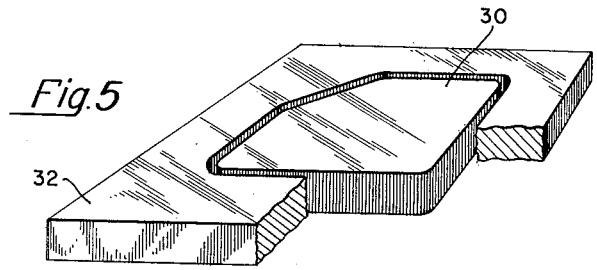
INVENTOR.
JOHN H. ZEDER, JR.
BY
*John B. Sowell*
ATTORNEY United States Patent Office 3,154,664
Patented Oct. 27, 1964

3,154,664
BLANKING DIES AND METHOD OF
MAKING SAME
John H. Zeder, Jr., Southampton, Pa., assignor to The
Budd Company, Philadelphia, Pa., a corporation of
Pennsylvania
Filed Dec. 7, 1962, Ser. No. 243,065
4 Claims. (Cl. 219—69)

This invention relates to blanking dies and more particularly to an improved method of making dies for blanking operations.

Heretofore, dies for blanking operations were usually solid punch dies cooperating with blanking die rings or alternatively, interfitting shear blades or rule dies. The former required considerable accurate skill in machining while the latter required considerable skill in hand fitting and finishing.

It would be extremely desirable to be able to make blanking dies without the requirement of skilled labor.

Therefore, it is a principal object of the present invention to provide a new and improved method of making blanking dies which provides a die system of superior quality with a minimum of skilled labor.

Another object of the present invention is to provide a die system employing an upper shear blade or rule die cooperating with a lower punch die and lower blanking die ring.

It is a further object of the present invention to provide a die system which employs a stripper plate which may be employed as a blanking punch or a blanking ring.

In a preferred embodiment of the present invention a shear blade or rule is fitted to the contour of a template and after being hardened is fitted into a mounting plate or retaining plate and attached to a backing plate or shoe to provide an upper steel rule blanking die. This steel rule blanking die is mounted in an electrical discharge machining device with a plate of tool steel mounted opposite the upper blanking die. Power leads are electrically connected to the upper blanking die and the plate of tool steel. The shear blade or steel rule is employed as a cutting tool electrode to machine by electrical discharge machining the tool steel plate and to cut the plate into two pieces. One of the pieces thus formed, the inner shear blade, may be employed as a punch die or alternatively as an inner stripper, and the other of the two pieces thus formed, the outer shear blade, may be employed as a blanking die ring or outer stripper.

Other features and objects of the invention will be found throughout the more detailed description. To more clearly portray the invention and its manner of operation the description is supplemented with the accompanying drawings wherein:

FIG. 1 is an elevation in section of the novel die system;

FIG. 2 is a section in plan view taken at section 2—2 of FIG. 1;

FIG. 3 is an elevation in section illustrating electrical discharge machining of a plate to form the lower dies by the upper dies;

FIG. 4 is an enlarged section in elevation of the electrodes shown in FIG. 3;

FIG. 5 is a partial perspective of the lower dies made by electrical discharge machining the tool steel plate of FIG. 3;

FIG. 6 is an elevation in section taken through the steel rule shear blade showing the blade in its three stages of preparation as a die.

Referring now to FIG. 1 showing the complete system of blanking dies as they would be operated in a brake press. The upper steel rule blanking die 10 comprises an upper platen 12, an insulation pad 14, a blacking plate or shoe 16, an outer retaining plate 18, an inner retaining plate 20, and a shear rule or blade 22. The upper die system may be made in any well known manner such as that set forth in Patent 2,703,022, 3,020,785 or 3,052,139. A preferred method of making the retaining plates 18 and 20 is to cut or machine a groove in a solid plate with a tool having the same width as the shear rule blade 12 thus enabling the fitting and bending of the blade while the retaining plates 18 and 20 act as templates for the desired shape. The plates are connected to the upper plates by well known means such as screws which attach to threads in the upper platen.

The lower blanking die 24 comprises a lower platen 26, a lower backing plate 38, an inner shear plate or punch plate 30, an outer shear plate or stripper 32, and a resilient cushion 34. In the preferred embodiment shown, shear plate 30 is coacting with shear rule 22 and shear plate 32 is acting as a stripper; however, shear plate 30 may be mounted on a resilient cushion and shear plate 32 mounted on a rigid backing plate to reverse the procedure, thus, shear plate 30 will become the stripper and shear plate 32 will become the ring or block die. Since the shear plates 30 and 32 are both made from the same material either is suited as a cooperating die with upper steel rule blanking die 10.

An advantage to the present method resides in employing the upper steel rule blanking die 10 in its finished or final assemblage to make the lower shear plates. Shear rule 22, as shown in FIG. 3, is mounted in retaining plate 18, 20, sectioned in the drawing as resin or plastic impregnated with a filler, however, this plate may be an electrical conducting metal if so desired. For example, it is possible to make inner retaining plate 20 of metal and to force shear rule 22 into engagement therewith by resistance welding the rule to the plate. Shear rule 22 is shown abutting backing plate 16 to make electrical contact therewith and may be firmly attached by brazing, resistance welding or flash welding. Insulating pad 14 is provided in the upper blanking die 10 solely to provide electrical insulation between upper platen 12 and backing plate 16, and may be omitted if there is no requirement for electrical isolation of upper platen 12.

Shear rule 22 is preferably fitted to the retaining plates by bending the rule in its soft or annealed state and subsequently hardening the shear rule 22 by heat treating after it has been so formed. The rule may be removed from the retaining plate and hardened at any stage of the operation, but is preferably hardened and permanently set in the retaining plates prior to cutting shear plates 30 and 32.

FIG. 3 illustrates an electrical discharge machining operation wherein metal is removed by means of an electrical discharge in the presence of a dielectric. Power supply 36 is provided with adjustable current and frequency control devices at voltage potentials up to several hundred volts; however, for precision work such as is illustrated here a voltage of twenty to seventy volts at several amperes and discharge frequencies of over 50,000 c.p.s. is preferred. Low current and high frequency tend to improve the surface finish when electrical discharge machining. While currents and voltages vary depending upon the dielectric and the metals employed these values may be obtained from charts supplied with commercially available machines such as those sold by Elox Corporation of Troy, Michigan. Machining accuracies of one ten-thousandth of an inch may be obtained from standard electrical discharge machines by employing recommended current voltages and frequencies.

Power supply 36 is provided with leads 38 of opposite polarity. One lead is electrically connected to the shear blade 22 and becomes the electrical cutting tool as shown in enlarged FIG. 4. The other lead is electrically connected to shear plate 30, 32 and becomes the workpiece electrode. As the cutting tool electrode 22a cuts its way into the workpiece electrode 30, 32 minute particles 42 of the electrodes are dislodged from the surface and carried away in the liquid dielectric 44 due to induced circulation in the liquid. In closed cavity machining the upper die is usually vibrated. Pump 46 circulates the liquid to aid induced circulation and to remove minute particles 42 in filter 48. It is only necessary to maintain the critical gap 40 between the electrodes to maintain continuous clean cutting of the workpiece. Once the cutting tool electrode 22 has finished the cut shown by dotted lines in FIG. 4, shear plate 30, 32 is separable into two distinct plates 30 and 32 as shown in FIG. 5. Either shear plate may be mounted on a rigid backing plate like plate 28 as shown in FIG. 1 so as to cooperate with shear rule 22. However, the shear rule should be beveled by grinding as shown in FIG. 6 to have the pointed edge matching the rigidly mounted die. It will be noted, as shown in FIG. 6, that the original end of electrode 22a was rectangular but due to discharge machining has been cut back to 22b and is further cut back due to beveling of the cutting edge to 22.

Electrical discharge machining has provided a set of shear plates 30, 32 which are in reality accurately machined and finished dies that may be alternately interchanged as a stripper and die set. The accuracy of working clearance between dies may be enhanced by providing pilots in the shear plate prior to machining which will accurately locate the shear plates relative to the upper blanking dies when mounted in a die system as shown in FIG. 1.

In actual practice the die system may be employed to cut thin tissue paper or semi-hard steel with equal facility even though the die system has been made without requiring a high degree of skill to fit and hand finish the dies.

The upper die in its final assemblage cuts its own cooperating blanking die and stripper to tolerances uniformly more accurate than hand finishing, thus producing a superior die system at lower cost by simplified steps which do not require a high degree of manual skill.

While a single preferred embodiment of the method of making a set of blanking dies from tool steel shear rules and tool steel plates has been illustrated other embodiments of the invention will suggest themselves to those skilled in the art. For example, inner shear plate 30 may be rough machined prior to electrical discharge machining which enables more complete circulation of the dielectric. However, only an inner die plate is obtained and a rubber stripper with no outer plate will need to be employed in the lower dies. If the shear rule 22 is provided with a tip of different material the erosion of the shear rule proper may be completely eliminated. The appended claims should be interpreted commensurate with the scope of the novel method disclosed.

What is claimed is:

1. The method of making a blanking die system comprising the steps of: fastening a homogeneous shear rule to an inner and outer retaining plate having a groove therebetween shaped to the contour of a blank to be cut by said shear rule, hardening said mounted homogeneous shear rule, attaching said hardened shear rule to a backing plate, mounting a plate of hardened tool steel opposite said mounted shear rule, connecting said shear rule to a power supply of a first polarity and connecting said hardened plate to a power supply of an opposite polarity, electrical discharge machining said plate of hardened tool steel into two separate and distinct pieces forming an inner and outer shear plate by employing said hardened homogeneous shear rule as the cutting tool electrode and said tool steel plate as a workpiece electrode, separating and mounting said pieces of said hardened tool steel plate as a die plate and stripper, and shaping the edges of said shear rule by grinding the ends of said cutting tool electrode to provide an upper shear rule die adapted to cooperate with said plates and said stripper.

2. A method of making blanking rule dies which comprises the steps of: making an upper steel rule blanking die comprising a non-composite shear rule, an inner and outer retaining plate, a backing plate, and a platen; placing said upper steel rule blanking die in an electrical discharge machine, connecting said non-composite shear rule to a first lead of said power supply of said electrical discharge machine; mounting a plate of tool steel opposite said upper steel rule blanking die in a dielectric bath of said electrical discharge machine; connecting said tool steel plate to another lead of said power supply of said electrical discharge machine; machining said tool steel plate as an electrode workpiece by employing said non-composite steel rule as an electrode cutting tool to machine said tool steel plate into two pieces forming an inner shear plate and an outer shear plate; mounting said inner shear plate on a backing plate to form a blanking punch adapted to cooperate with said shear rule in a blanking die system; and mounting said outer shear plate on a resilient cushion to act as a blanking ring stripper cooperable with said blanking die system.

3. The method of making a steel rule die system comprising the steps of: cutting a template to the size and shape of the blank to be cut by said dies, bending an unhardened all-tool-steel shear blade to the same contour as said template, hardening said bent shear blade, attaching said hardened and bent all-too-steel shear blade to a first mounting plate to form an upper steel rule blanking die, attaching a plate of hardened tool steel to a support plate, cutting said plate of tool steel into two pieces forming an inner and an outer shear plate by electrical discharge cutting using said hardened all-tool-steel rule shear blade as an electrode cutting tool and said tool steel plate as the electrode workpiece, separating and mounting the two pieces of said tool steel plate, one of said pieces being mounted on a resilient cushion to form a stripper and the other of said pieces being mounted on a second mounting plate to form a plate die adapted for coaxial engagement with said upper steel rule blanking die to form a steel rule die system.

4. The method of making a blanking die system comprising the steps of:
    making a male die by bending a shear rule and hardening the shear rule and mounting the shear rule to a backing plate to provide a male shear rule die having a hardened all-steel shear rule,
    mounting said male shear rule die in a dielectric bath of an electrical discharge machine,
    mounting a hardened tool steel plate opposite said male shear rule die in said dielectric bath of said electrical discharge machine, electrical discharge machining said hardened tool steel plate as an electrode workpiece by employing said all-steel shear rule of said male shear rule die as an electrode cutting tool to machine said tool steel plate into two distinct shear plates forming an inner shear plate and an outer shear plate, mounting one of said shear plates on a fixed backing plate to provide a female blanking die, mounting the other of said shear plates on a resilient cushion intermediate said fixed backing plate and said other of said shear plates to provide a stripper for said female blanking die, said shear plates providing a female blanking die of hardened tool steel, and sharpening said hardened all-steel shear rule of said male shear rule die, said male shear rule die and said female blanking die being adapted to cooperate to provide a precision fit blanking die system.

References Cited by the Examiner

UNITED STATES PATENTS

| | | | |
|---|---|---|---|
| 928,256 | 7/09 | Grissom | 83—142 X |
| 2,073,893 | 3/37 | Wilkie | 83—685 X |
| 2,765,394 | 10/56 | Griffith | 219—69 |
| 2,800,566 | 7/57 | Matulaitis | 219—69 |
| 2,813,966 | 11/57 | Matulaitis | 219—69 |
| 2,924,701 | 2/60 | Stamper | 219—69 |
| 2,927,190 | 3/60 | Dulebohn et al. | 219—69 |
| 3,022,758 | 2/62 | Rheingold et al. | 83—685 X |
| 3,120,601 | 2/64 | Berlin et al. | 219—69 |

RICHARD M. WOOD, *Primary Examiner.*

ANTHONY BARTIS, *Examiner.*